United States Patent [19]
Nakamichi et al.

[11] Patent Number: 5,670,184
[45] Date of Patent: Sep. 23, 1997

[54] MOLDING APPARATUS HAVING A MOLDING CAVITY DIVIDED BY AN ELASTIC MEMBER

[75] Inventors: Kousaku Nakamichi; Kazunori Miura; Shoichi Inaba, all of Shizuoka, Japan

[73] Assignee: Kabushiki Kaisha Bandai, Japan

[21] Appl. No.: 589,375

[22] Filed: Jan. 22, 1996

[30] Foreign Application Priority Data

Jan. 25, 1995 [JP] Japan .................................. 7-028756
Dec. 1, 1995 [JP] Japan .................................. 7-338145

[51] Int. Cl.⁶ .................................................. B29C 45/16
[52] U.S. Cl. .............. 425/130; 264/255; 264/297.2; 264/328.8; 425/556; 425/572; 425/573; 425/577
[58] Field of Search ............................ 425/130, 572, 425/573, 577, 588, 556; 264/255, 297.2, 328.8

[56] References Cited

U.S. PATENT DOCUMENTS

| | | |
|---|---|---|
| 4,726,758 | 2/1988 | Sekine et al. ................ 425/577 |
| 4,840,760 | 6/1989 | Oishi ............................ 264/255 |
| 4,990,077 | 2/1991 | Morita ........................... 425/577 |
| 5,094,602 | 3/1992 | Morita ........................... 425/130 |
| 5,186,955 | 2/1993 | Morita et al. ................. 425/130 |
| 5,472,655 | 12/1995 | Morita ........................... 425/588 |

*Primary Examiner*—Tim Heitbrink
*Attorney, Agent, or Firm*—Graham & James LLP

[57] ABSTRACT

A molding apparatus includes a movable mold-defining member mounted on the movable side of an injection machine and a stationary mold-defining member mounted on its stationary side. Those members are joinable to define a mold cavity and a runner channel therebetween. The movable mold-defining member is provided with a dividing member for dividing the runner channel, or cavity, or both into a plurality of portions. The dividing member is normally urged by an elastic member to project into the channel, or cavity. The dividing member has one side which is substantially perpendicular to the direction of flow of a molding resin material to stop its flow past the dividing member, and an opposite side cut away partly to form a recess at one end thereof, so that another molding resin material reaching the opposite side may flow into the recess and thereby move said dividing member out of the channel, or cavity by overcoming the force of the elastic member.

6 Claims, 18 Drawing Sheets

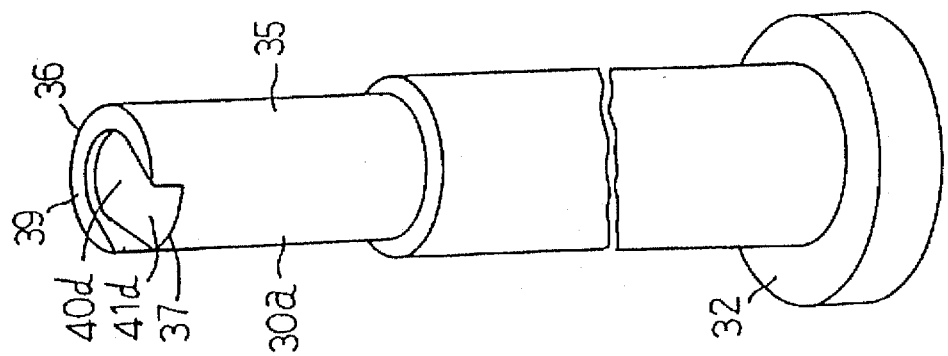
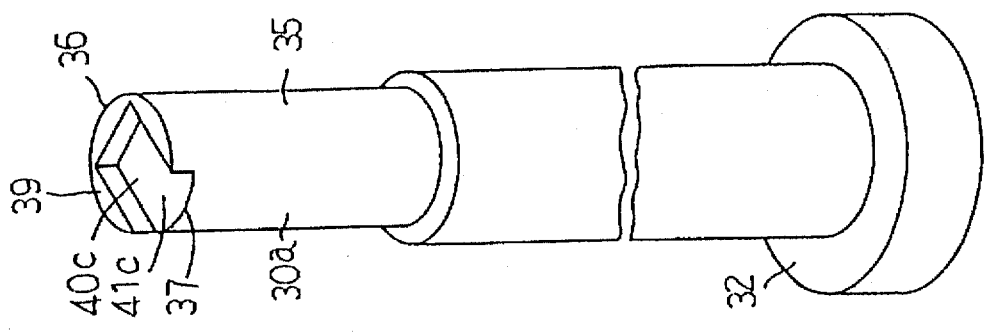
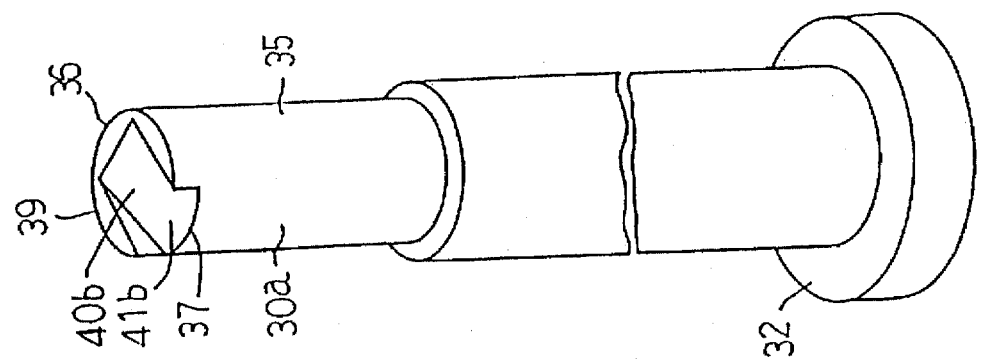
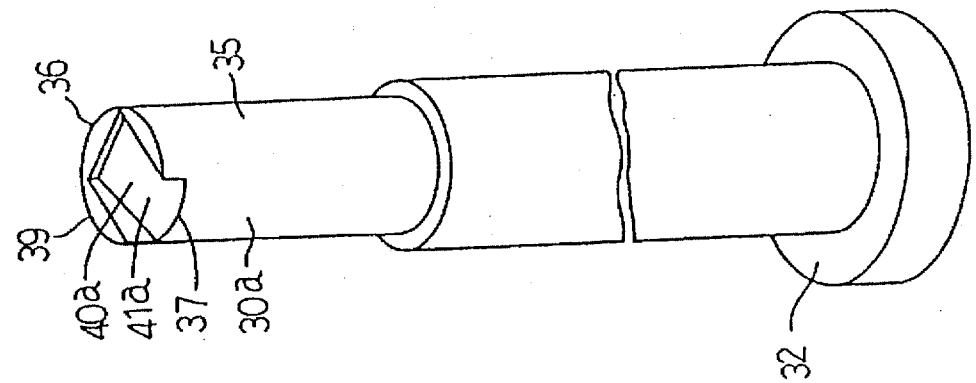

A molding apparatus having a molding cavity divided by an elastic member

MOLDING APPARATUS HAVING A MOLDING CAVITY DIVIDED BY AN ELASTIC MEMBER

BACKGROUND OF THE INVENTION

1. Field of the Invention

This invention relates to a molding apparatus for making a multicolored molded product.

2. Description of the Prior Art

There is known a multicolored molded product disclosed in Japanese Utility Model Publication No. Hei 3-34225 and comprising a plurality of elements B, P, R and Y formed from synthetic resin materials of different colors and joined together by runners. It is manufactured by forming the elements P and R in a first mold, transferring them to a second mold, and forming the elements B and Y so that they may enclose the ends of runners projecting from the elements P and R.

There is also known a multicolored molded product disclosed in Japanese Patent Publication No. Hei 4-60806, FIG. 10 and comprising a plurality of differently colored components joined to a single runner. Each component may have two colors. It is manufactured by a molding apparatus as shown in FIG. 5 accompanying the same publication. The apparatus has a first slide plate to which knockout pins for ejecting a molded product are secured, a pin for opening and closing the gate of a runner channel, and a second slide plate provided with members for dividing a molding space. The apparatus forms a multicolored molded product when the second slide plate is moved by a driving device, such as a hydraulic one. The first slide plate is driven to allow the knockout pins to eject the product.

The apparatus which is used for manufacturing the product disclosed in the utility model publication cited above has, however, the drawbacks of being complicated in construction and expensive, since it includes a plurality of molds and means for transferring the molded product from the first to the second mold, though it may be sufficient to join the runners together.

The apparatus disclosed in the patent publication has also the drawbacks of being complicated in construction, large in size and expensive because of the slide plates, pins and driving device which it includes as stated above. Moreover, its heavy weight imposes a great burden upon the injection machine on which the apparatus is mounted.

SUMMARY OF THE INVENTION

Under these circumstances, it is an object of this invention to provide a molding apparatus which is simple in construction, small in size and weight, and inexpensive.

This object is attained by a molding apparatus comprising:

a) a movable mold-defining member mounted on the movable side of an injection machine and a stationary mold-defining member mounted on its stationary side;

b) the movable and stationary mold-defining members being joinable to define therebetween a mold and runner channels which allow molding resin materials to flow into the mold;

c) the movable or stationary mold-defining member being provided with at least one dividing member which is movable into and out of one of the runner channels, or the mold for dividing the channel, or mold into a plurality of portions;

d) the dividing member being provided with an elastic member urging the dividing member to move into the channel, or mold;

e) the dividing member having one side which is substantially perpendicular to the direction of flow of one molding resin material to stop the flow of the material past the dividing member;

f) the dividing member having an opposite side cut away partly to form a recess at one end thereof, so that another molding resin material reaching the opposite side may flow into the recess and thereby move the dividing member out of the channel, or mold by overcoming the force of the elastic member.

The injection machine is operated to join the movable mold-defining member to the stationary one. If the dividing member is provided for dividing one of the runner channels, a molding resin material is injected by the injection machine into the runner channel so as to flow in one direction until its flow is stopped by one side of the dividing member. If another molding resin material having a different color is injected into the runner channel so as to flow in the opposite direction, it flows into the recess on the opposite side of the dividing member and thereby pushes it out of the runner channel by overcoming the force of the elastic member. The latter material fills the space occupied until then by the dividing member and is joined with the former material, whereby a multicolored runner is formed in the runner channel.

In the event that the dividing member is provided for dividing the mold, the molding resin material injected into a runner channel flows in one direction into the mold cavity until its flow is stopped by one side of the dividing member. Another molding resin material having a different color is injected into the mold through another channel so as to flow in the opposite direction. It flows into the recess on the opposite side of the dividing member and thereby pushes it out of the mold cavity by overcoming the force of the elastic member. The latter material fills the space occupied until then by the dividing member and is welded to the former material, whereby a multicolored molded product is formed in the mold.

The apparatus of this invention has only one mold and yet facilitates the manufacture of a multicolored molded product, or runner. It is less complex in construction, small in size and weight, and inexpensive. It does not exert any undesirably large burden on the injection machine on which it is mounted.

BRIEF DESCRIPTION OF THE DRAWING

FIGS. 2(a) to 2(d) are each a partly cut away perspective view of a dividing member;

DETAILED DESCRIPTION OF THE INVENTION

Figure 1:
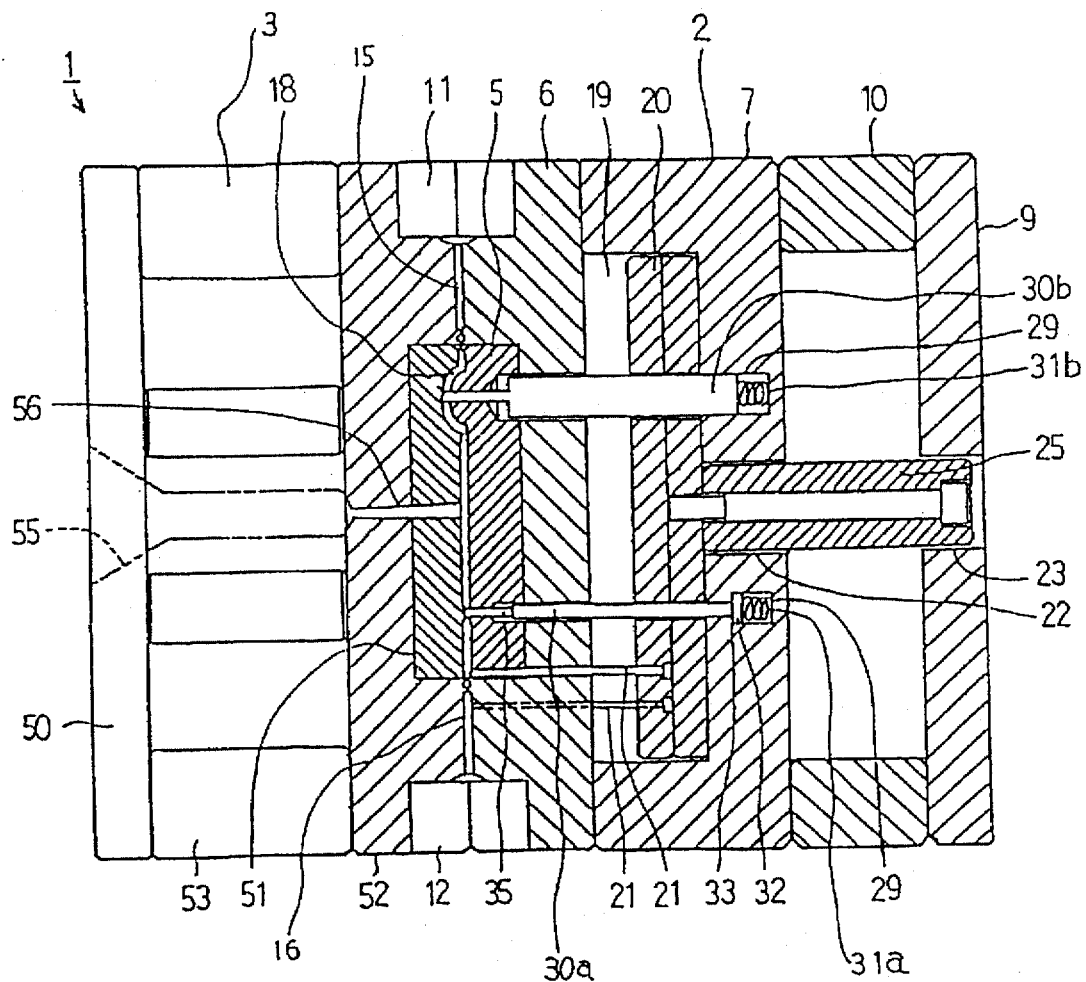
FIG. 1 is a cross sectional view of a molding apparatus embodying this invention.

A molding apparatus 1 comprises a movable mold-defining member 2 mounted on the movable side of a known injection machine (not shown) and a stationary mold-defining member 3 mounted on its stationary side, as shown in FIG. 1. The movable and stationary mold-defining members 2 and 3, when joined together, define therebetween a mole 18 and runner channels 15 and 16 through which molding resin materials can be introduced into the mold 18.

Figure 4:
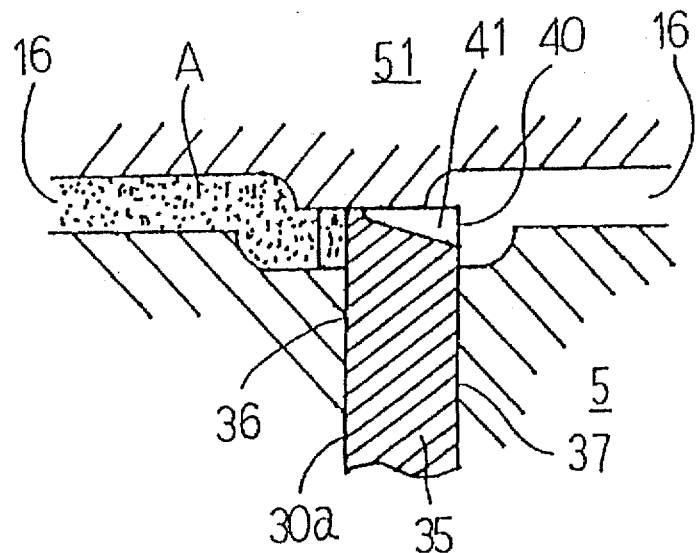
FIG. 4 is an enlarged cross sectional view of a part of the apparatus showing it at one point of time in a molding operation.

The movable mold-defining member 2 (or the stationary mold-defining member 3) is provided with a dividing member 30a which is movable into or out of the runner channel 16 to divide it or open it, respectively. The dividing member 30a is urged by an elastic member 31a to move into the runner channel 16. The dividing member 30a has one side 36 which is substantially perpendicular to the direction of flow of a molding resin material to stop its flow, as shown in FIG. 4. On another side 37 thereof, the dividing member 30a has a recess 40 which is open at the top end 39 of the dividing member 30a, as shown in FIG. 2, so that a molding resin material flowing toward the side 37 and into the recess 40 may force down the dividing member 30a out of the runner channel 16 by overcoming the elasticity of the elastic member 31a.

Figure 3:
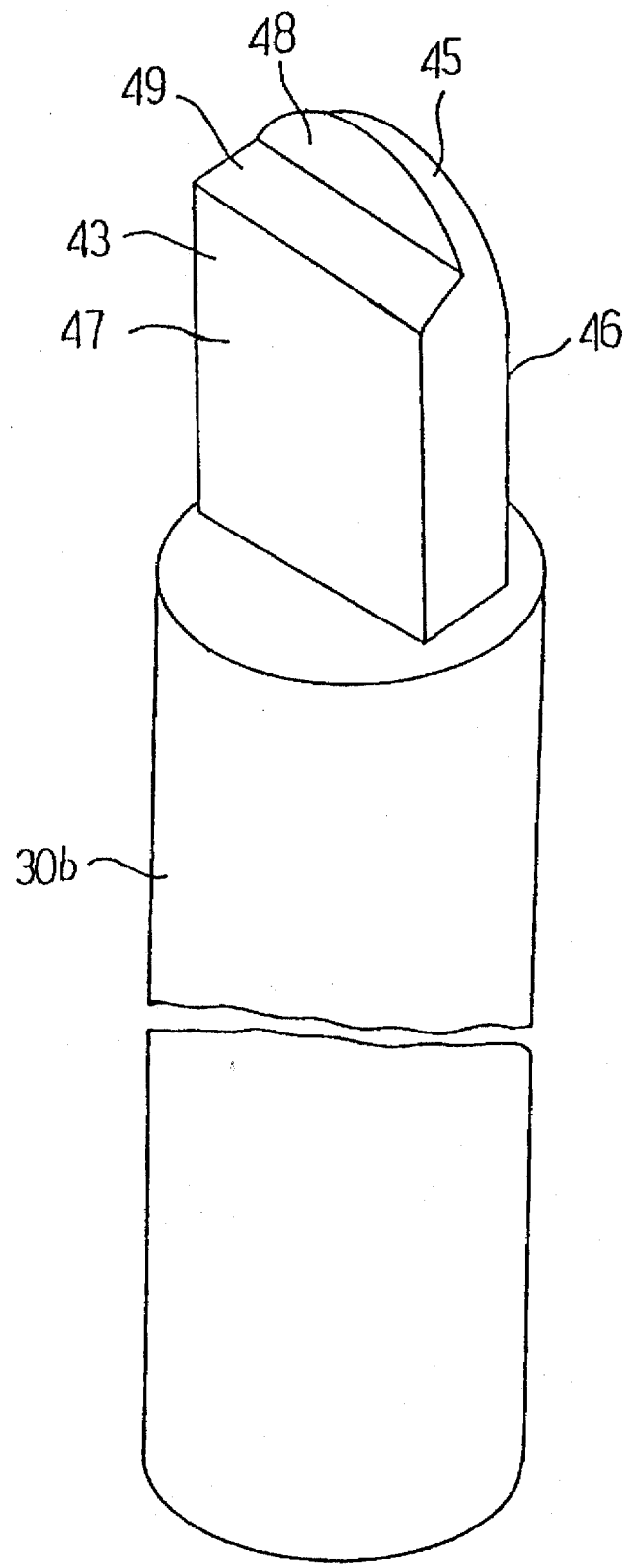
FIG. 3 is a partly cut away perspective view of an alternative embodiment of a dividing member.

The movable mold-defining member 2 (or the stationary mold-defining member 3) is provided with a dividing member 30b which is movable into the mold 18 to divide it or open it, respectively, as shown in FIG. 1. The dividing member 30b is urged by an elastic member 31b such as a spring member to move into the mold 18. The dividing member 30b has one side 46 which is substantially perpendicular to the direction of flow of a molding resin material, as shown in FIG. 3. In operation, this perpendicular side serves to stop the flow of the molding material impinging upon it. On another side 47 thereof, the dividing member 30b has a recess 48 which is open at the top end 45 of the dividing member 30b, so that a molding resin material flowing toward the side 47 and into the recess 48 may force down the dividing member 30b out of the mold 18 by overcoming the force applied by elastic member 31b.

Thus, the molding apparatus 1 has its movable mold-defining member 2 mounted on the movable side of the injection machine and its stationary mold-defining member 3 mounted on its stationary side. When the injection machine is driven to join the movable mold-defining member 2 to the stationary mold-defining member 3, the mold 18 and the runner channels 15 and 16 for introducing the molding resin materials into the mold 18 are formed.

Figure 5:
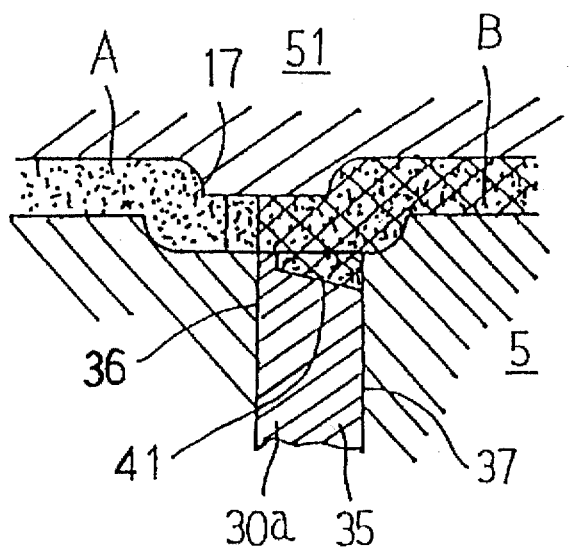
FIG. 5 is a view similar to FIG. 4, but showing that part of the apparatus at a different point of time in the molding operation.

In operation, the injection machine introduces a molding resin material A into the runner channel 16 in one direction, as shown in FIG. 4. The molding resin material A is blocked by one side 36 of the dividing member 30a and stops flowing. The injection machine introduces a second molding resin material, material B, which preferably has a different color from that of molding resin material A, the runner channel 16 in the opposite direction, so that the molding resin material B may flow into the recess 40 on the other side 37 of the dividing member 30a, as shown in FIG. 5. The flowing pressure of the molding resin material B acts upon bottom 41 of the recess 40 and forces down the dividing member 30a by overcoming the force applied by elastic member 31a. The molding resin material B flows into the space occupied until then by the dividing member 30a and joins with the first molding resin material A. Thus, a multicolored runner 17 is formed in the runner channel 16.

Figure 10:
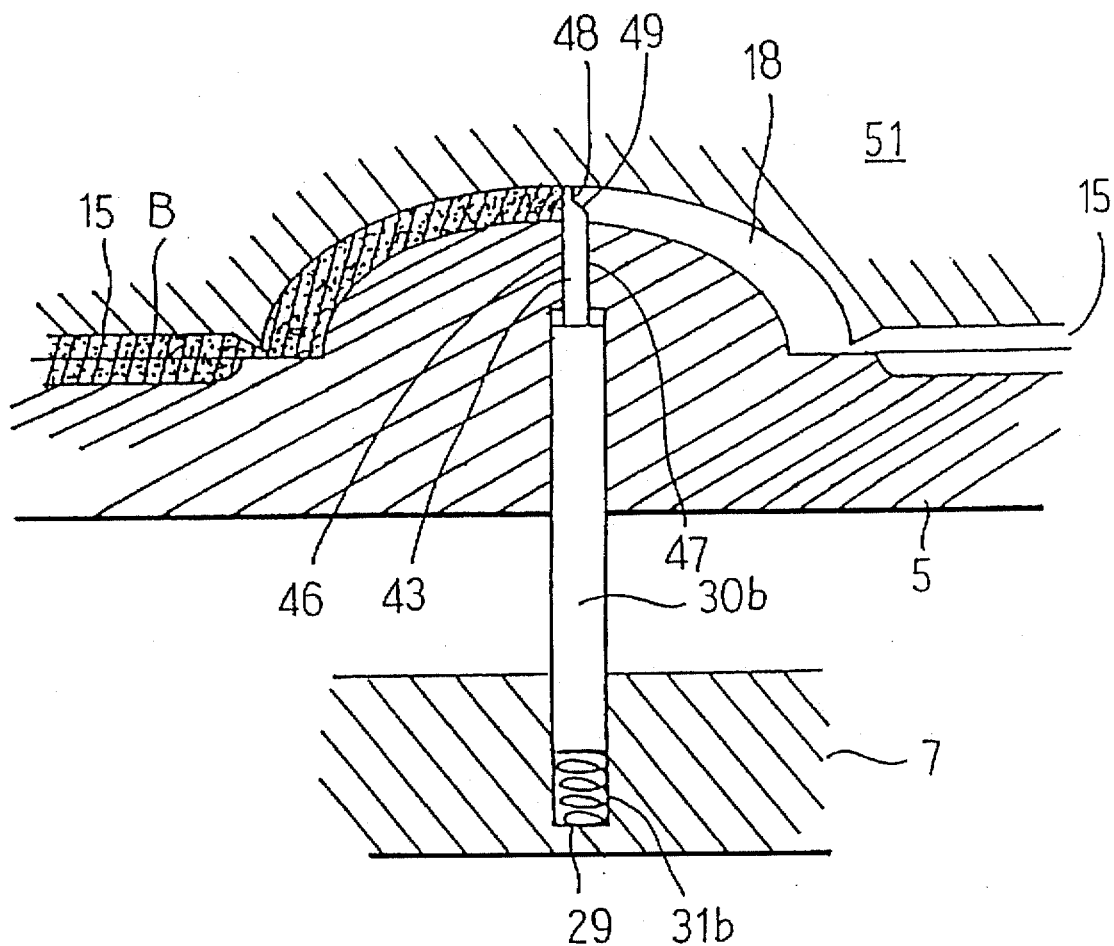
FIG. 10 is an enlarged cross sectional view of a part of the apparatus showing it at one point of time in a molding operation.
Figure 11:
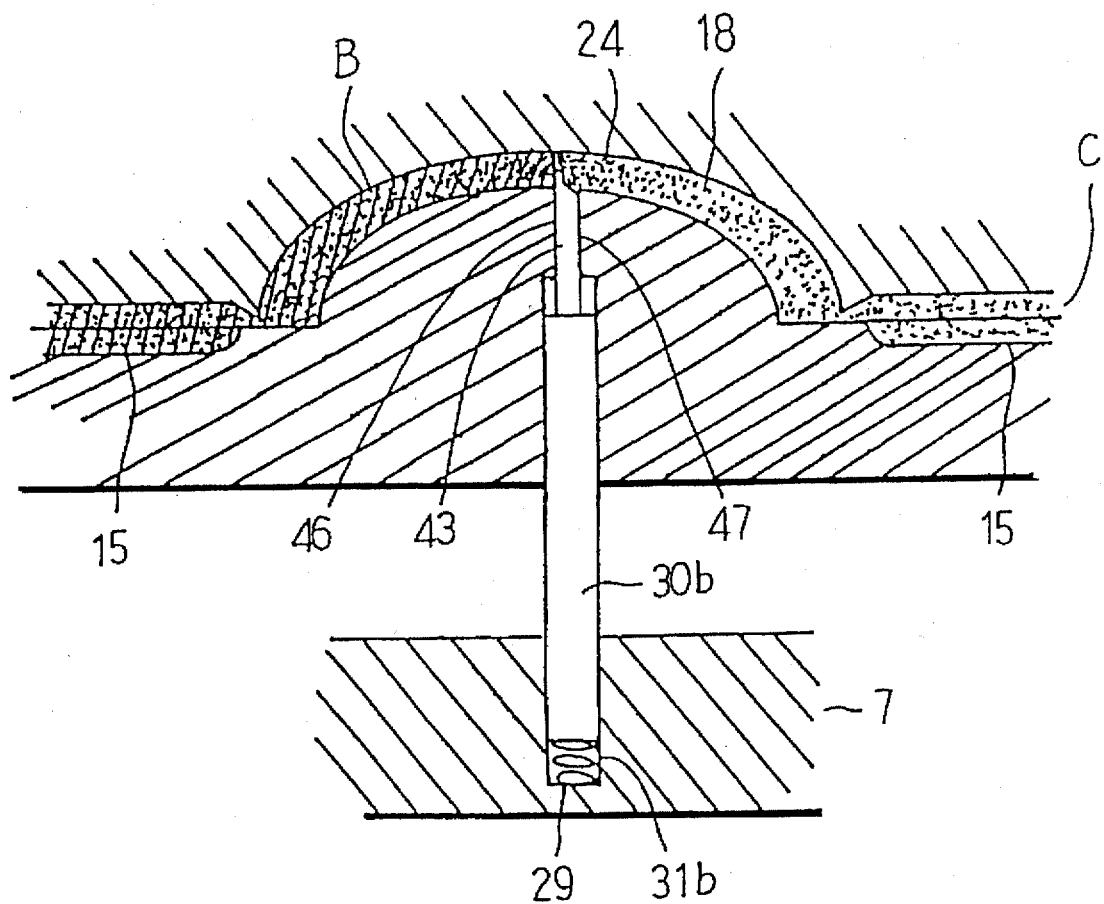
FIG. 11 is a view similar to FIG. 10, but showing that part of the apparatus at a different point of time in the molding operation.

The injection machine also may introduce a molding resin material B into the runner channel 15 in one direction, as shown in FIG. 10. The molding resin material B flows into the mold 18, is blocked by a first side 46 of the dividing member 30b and stops flowing. The injection machine introduces another molding resin material, material C, having a different color from that of material B, into the runner channel 15 in the opposite direction, as shown in FIG. 11. The molding resin material C also flows into the mold 18, and into the recess 48 on the opposite side 47 of the dividing member 30b from the first side 46. The flowing pressure of the molding resin material C acts upon the bottom 49 of the recess 48 and forces down the dividing member 30b by overcoming the elasticity of the elastic member 31b. The molding resin material C flows into the space occupied until then by the dividing member 30b and is joined with the first molding resin material, material B. Thus, a multicolored molded product 24 is formed in the mold 18.

Figure 14:
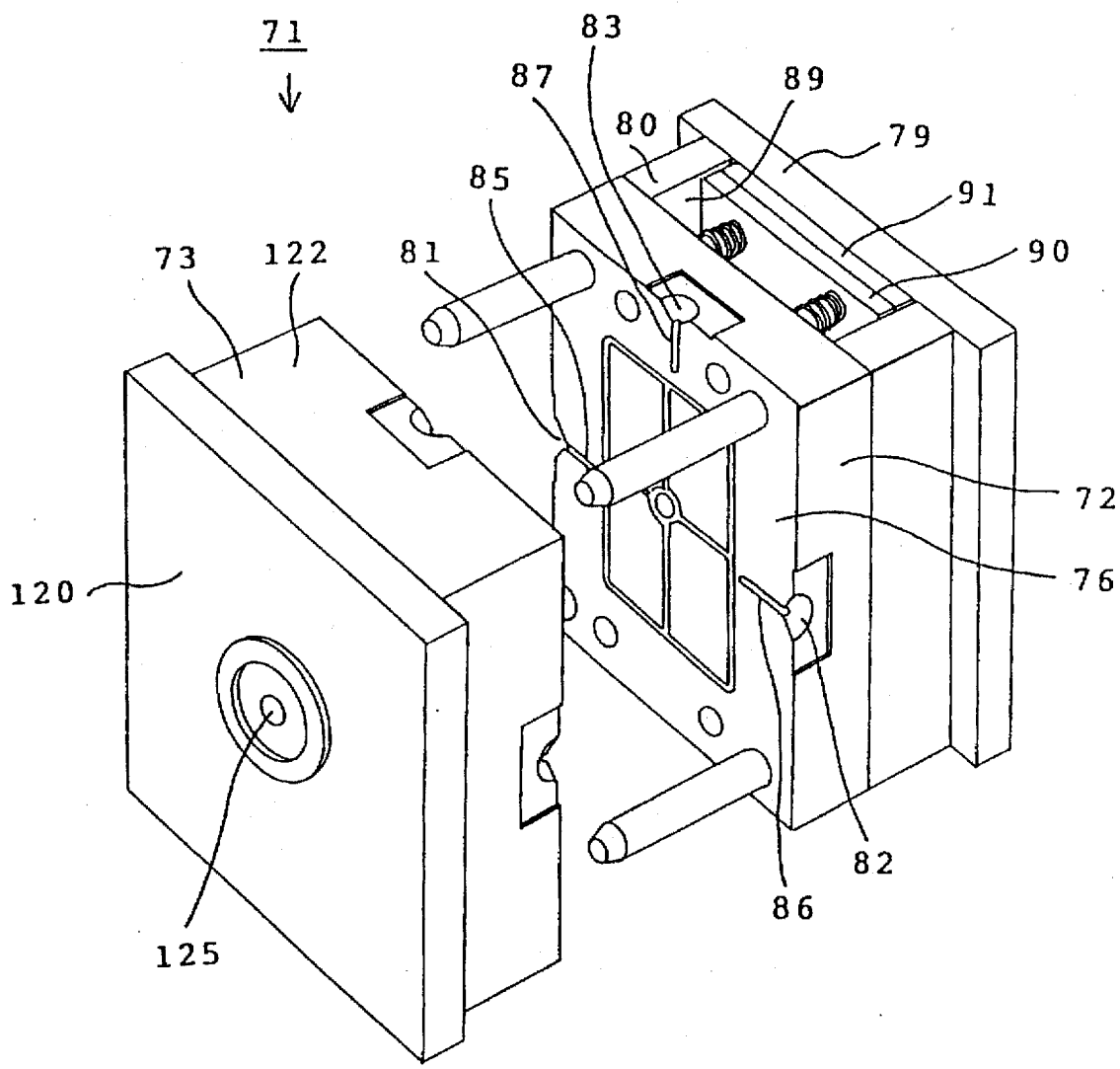
FIG. 14 is an external perspective view showing an alternative embodiment of this invention.
Figure 15:
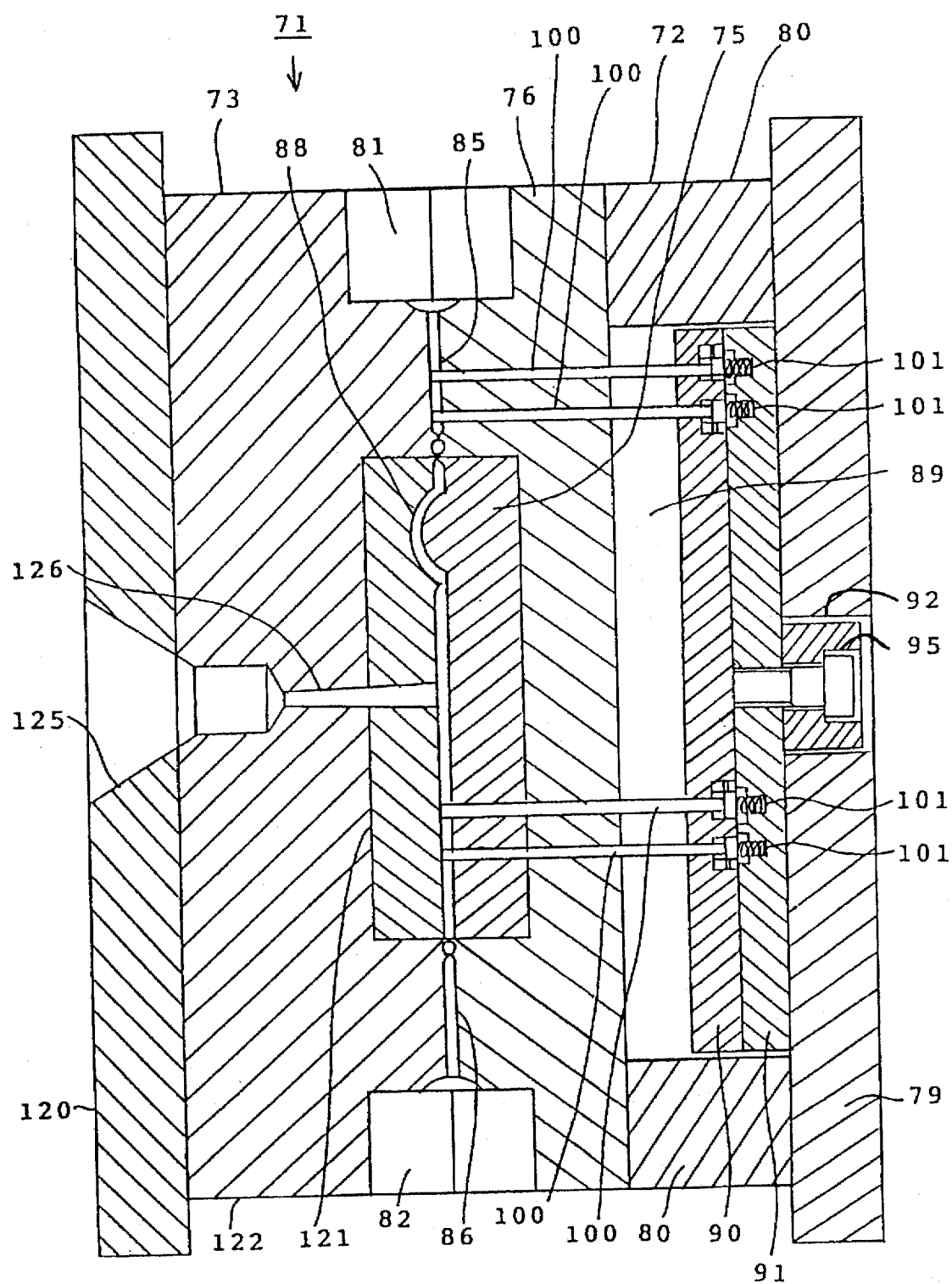
FIG. 15 is a cross sectional view showing an alternative embodiment of this invention.

Another mode of molding apparatus which embodies the invention will now be described with reference to FIGS. 14–27. The molding apparatus 71 comprises a movable mold-defining member 72 mounted on the movable side of a known injection machine (not shown), and a stationary mold-defining member 73 mounted on its stationary side, as shown in FIG. 15. The movable and stationary mold-defining members 72 and 73, when joined together, define therebetween a mold 88 and runner channels 85 and 86 through which molding resin materials are introduced into the mold 88.

The movable mold-defining member 72 defines a chamber 89 therein. The chamber 89 contains ejecting plates 90 and 91 which are movable toward the stationary mold-defining member 73. The ejecting plates 90 and 91 are provided with paired dividing members 100 which are urged by elastic members 101 toward the stationary mold-defining member 73. Each pair of dividing members 100 are movable into the runner channels 85, 86 so as to divide them.

Figure 16:
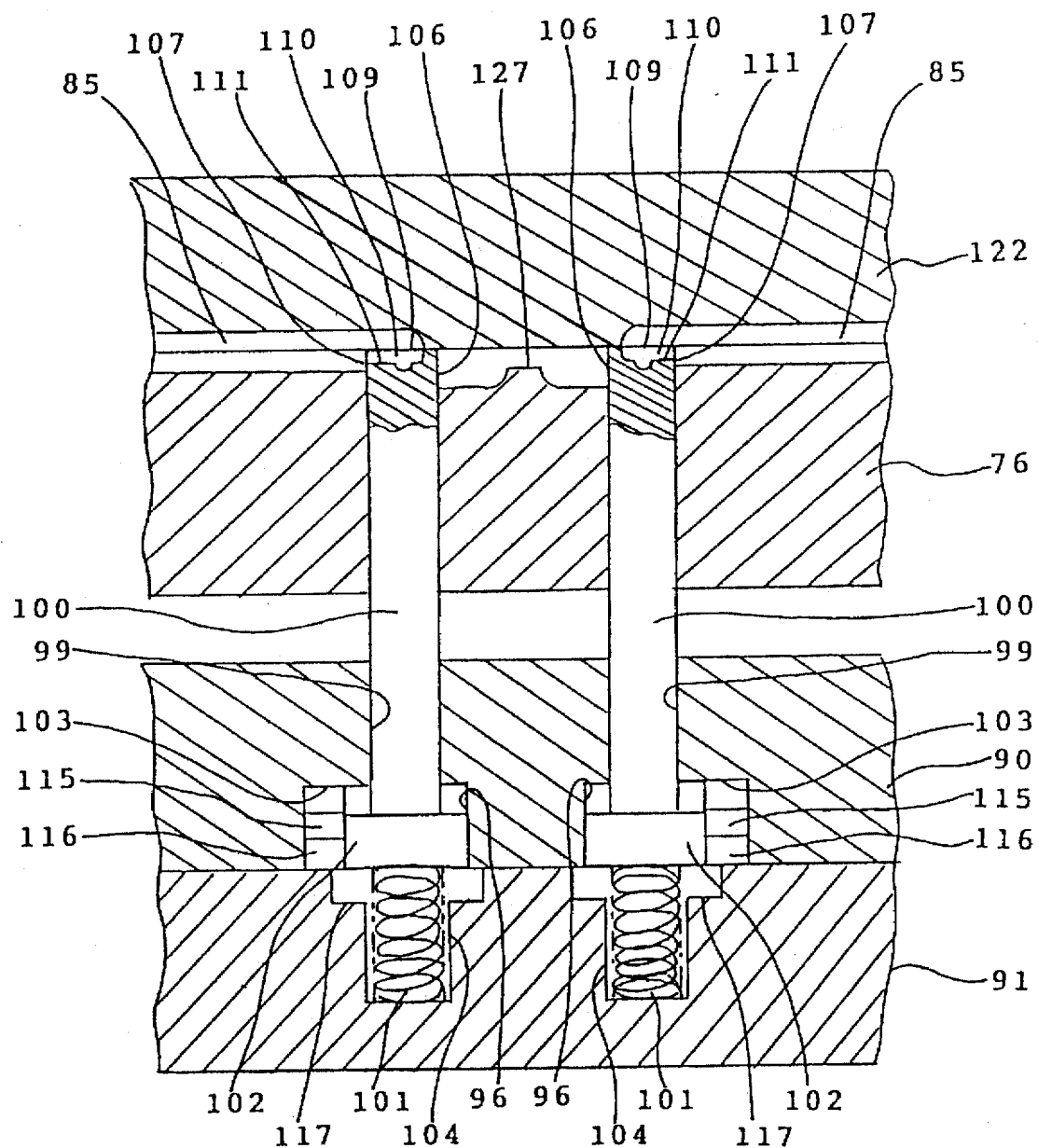
FIG. 16 is a partly cut away and enlarged cross sectional view of FIG. 15.
Figure 17:
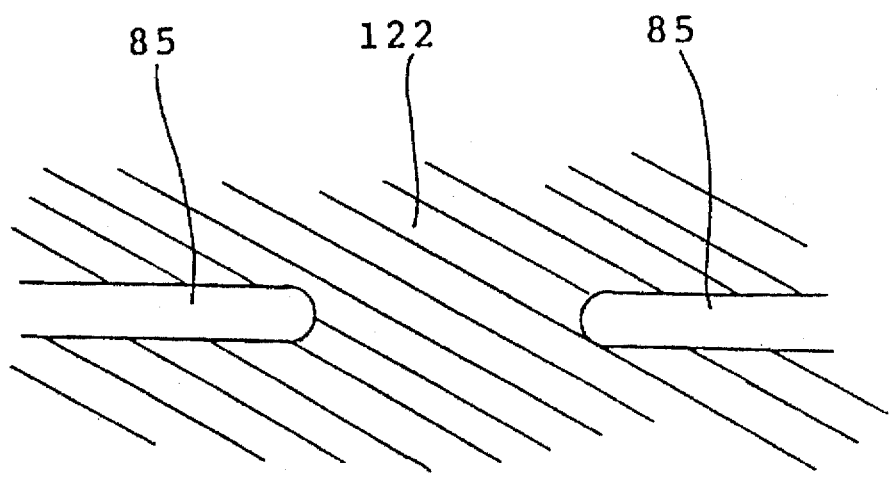
FIG. 17 is a partly cut away plan view showing an alternative embodiment of a female mold-defining member of this invention.

Each dividing member 100 has one side 106 which is substantially perpendicular to the direction of flow of a molding resin material to stop its flow, and the sides 106 of each pair of dividing members 100 preferably face each other, as shown in FIG. 16. On another side 107 thereof, each dividing member 100 may have a recess 110 which is open at its top end 109.

Thus, the molding apparatus 71 has its movable mold-defining member 72 mounted on the movable side of the injection machine and its stationary mold-defining member 73 mounted on its stationary side. When the injection machine is driven to join the movable mold-defining member 72 to the stationary mold-defining member 73, the mold 88 and the runner channels 85 and 86 for introducing the molding resin materials into the mold 88 are formed.

Figure 21:
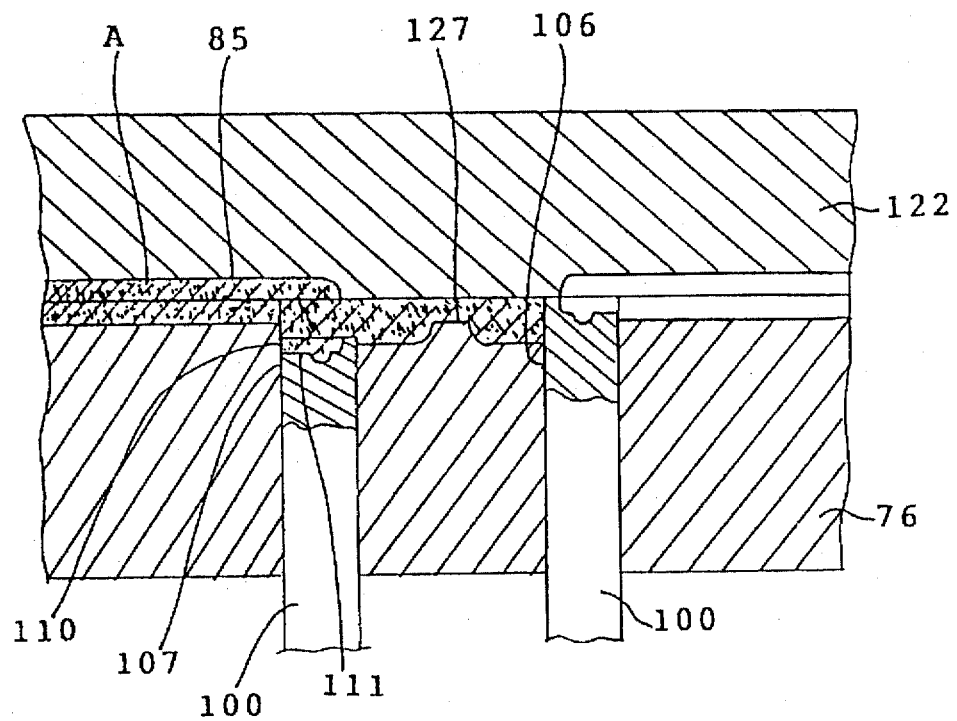
FIG. 21 is a partly cut away perspective view showing an alternative embodiment of a male mold-defining member of this invention.

The injection machine introduces a molding resin material A into the runner channel 85 in one direction, as shown in FIG. 21. The molding resin material A flows into the recess 110 on the side 107 of the nearer dividing member 100. The flowing pressure of the molding resin material A acts upon the bottom 111 of the recess 110 and forces down the nearer dividing member 100 by overcoming the elasticity of the elastic member 101. The molding resin material A continues to flow in the runner channel 85, is blocked by side 106 of the next dividing member 100 and stops flowing.

Figure 22:
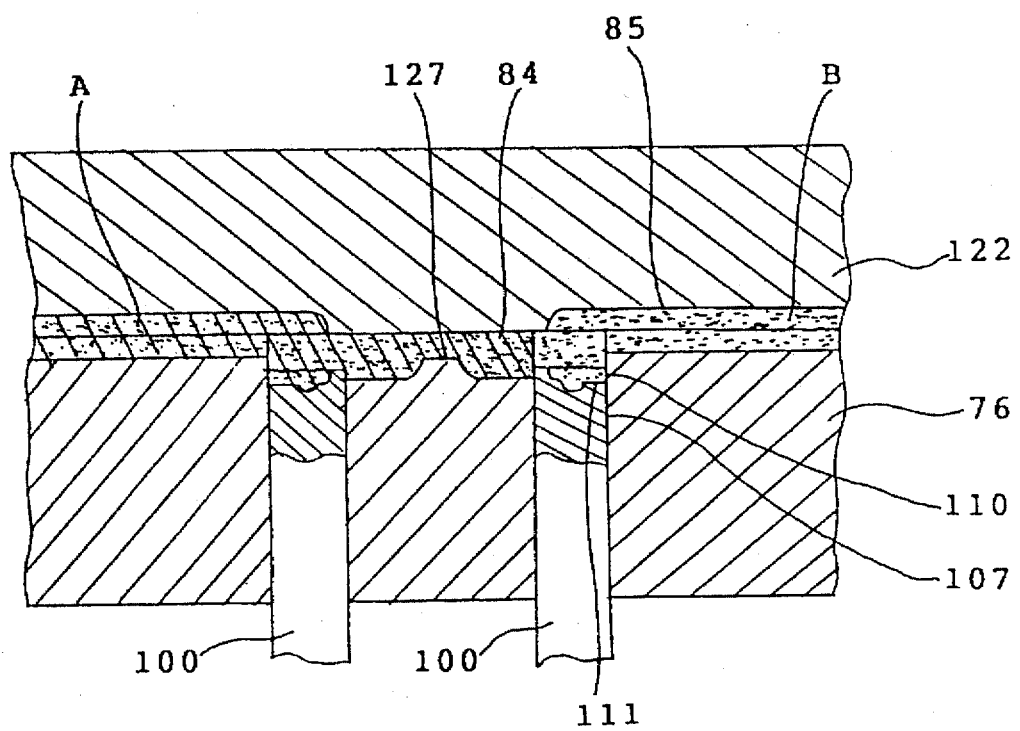
FIG. 22 is cross sectional view showing one point of time in a molding operation.

The injection machine may then introduce a second molding resin material, material B in the opposite direction from the direction of flow of material A. Molding resin material B flows into the recess 110 adjacent side 107 of the next dividing member 100, as shown in FIG. 22. The flowing pressure of the molding resin material B acts upon the bottom 111 of the recess 110 and forces down the next dividing member 100 by overcoming the elasticity of the elastic member 101. The molding resin material B flows into the space occupied until then by the next dividing member 100 and is joined with the first molding resin material A. Thus, a multicolored runner 84 is formed in the runner channel 85.

If the injection machine is driven to separate the movable mold-defining member 72 from the stationary mold-defining member 73, while the electing plates 90 and 91 are moved toward the stationary mold-defining member 73, the runner 84 adhering to the movable mold-defining member 72 is ejected by the dividing members 100, so that a product 94 molded in the mold 88 may be removed from the molding apparatus 71.

Preferred embodiments of the invention will now be explained in accordance with the drawings. A molding apparatus embodying this invention is generally shown at 1 in FIG. 1, and comprises a movable mold-defining member 2 mounted on the movable side of a known injection machine (not shown) and a stationary mold-defining member 3 mounted on its stationary side. The movable mold-defining member 2 comprises a mounting plate 6 on which a male mold-defining member 5 is mounted, a base 7 on which the mounting plate 6 is supported, a mounting plate 9 by which the movable mold-defining member 2 is mounted on the injection machine, and a pair of spacers 10 disposed between the base 7 and the mounting plate 9 along the opposite edges of the assembly. The male mold-defining member 5 defines a mold 18 with a female mold-defining member 51. The apparatus 1 has a pair of opposite recesses 11 and 12 into which injection nozzles can be connected for injecting differently colored molding resin materials into the mold 18 through runner channels 15 and 16, respectively.

The base 7 defines a chamber 19 in which a slide plate 20 is slidably supported. A plurality of knockout pins 21 project from the slide plate 20. Each knockout pin 21 extends through the male mold-defining member 5 or the mounting plate 6 and has a free end which is movable into the mold 18, or the runner channel 15 or 16 for ejecting a multicolored molded product from the mold 18, or a multicolored runner from the channel 15 or 16. The base 7 has a hole 22 in its central portion and the mounting plate 9 likewise has a hole 23 in its central portion. A push shaft 25 extends between the base 7 and the mounting plate 9 and is slidably supported in the holes 22 and 23, and the slide plate 20 is secured to one end of the push shaft 25.

The base 7 has two holes 29 facing in the direction of the stationary mold-defining member 3 and is provided with two axially slidable dividing members 30a, 30b each having a base end fitted slidably in one of the holes 29. Each hole 29 contains a coiled spring 31a, 31b held against the base end of the dividing member 30 for urging it in the direction of the stationary mold-defining member 3. Each or at least one dividing member 30 may have a flange 32 formed around its base end, while the hole 29 may have a varying diameter defining a shoulder 33 with which the flange 32 is engageable, so that the flange 32 and the shoulder 33 may define the stroke of the dividing member 30. One of the dividing members 30 is provided for dividing the runner channel 16 into two portions, while the other dividing member 30 is provided for dividing the mold 18 into two cavity portions, and each dividing member 30 extends across the runner channel 16, or mold cavity, and has a free end held against the female mold-defining member 51.

The stationary mold-defining member 3 comprises a mounting plate 50 by which it is mounted on the injection machine (not shown), a mounting plate 52 on which the female mold-defining member 51 is mounted, and a pair of spacers 53 disposed between the mounting planes 50 and 52 along the opposite edges of the assembly. The mounting plate 50 has a recess 55 into which an injection nozzle can be connected, so that its inner end may be connected with a sprue hole 56 extending through the mounting plate 52 and the female mold-defining member 51. The sprue hole 56 is so formed as to be connected with the runner channels 15 and 16.

Referring in further detail to the dividing members 30, the dividing member 30a for dividing the runner channel 16 is in the form of a round shaft, though it may alternatively have another shape in cross section. The dividing member 30a has a diametrically reduced end portion 35 having a free end 39 protruding into the runner channel 16 and held against the female mold-defining member 51, as the dividing member 30a is normally urged toward the female mold-defining member 51 by the coiled spring 31a. The diametrically reduced end portion 35 has one side 36 which is substantially perpendicular to the direction of flow of a molding resin material in the runner channel 16, while its diametrically opposite side 37 is partly cut away to form a recess 40 at the end 39 of the dividing member 30a.

The recess 40 may have any of a variety of shapes, as shown by way of example in FIGS. 2(a) to 2(d). The recess 40a shown in FIG. 2(a) has a bottom 41a inclined downwardly toward the side 37 and is surrounded by walls on three sides, while it is open on the side 37 and the end 39. The recess 40b shown in FIG. 2(b) has a bottom 41b inclined downwardly from the end 39 to the side 37 and extending between a pair of sidewalls. The recess 40c shown in FIG. 2(c) is similar to the recess 40a of FIG. 2(a), but has a bottom 41c which is not inclined, but is parallel to the end 39. The recess 40d shown in FIG. 2(d) has a bottom 41d similar to the bottom 41a of the recess 40a shown in FIG. 2(a), but is substantially semicircular when viewed from above the end 39, while all of the other recesses 40a to 40c are substantially square.

The dividing member 30b for dividing the mold 18 has a flattened end portion 43, as shown in FIG. 3. The flattened end portion 43 has a top end 45 protruding into the mold 18 and held against the female mold-defining member 51, as the dividing member 30b is normally urged toward the female mold-defining member 51 by the coiled spring 31a. The end 45 has a surface which is so curved as to mate with the inner surface of the female mold-defining member 51 forming the mold 18. The end portion 43 has one side 46 which is substantially perpendicular to the direction of flow of a molding resin material in the mold 18, while its opposite side 47 is partly cut away to form at the end 45 a recess 48 having a bottom 49 which is downwardly inclined toward the side 47.

Referring to the operation of the molding apparatus 1, a molding resin material having an "A" color is injected into the runner channel 16 through the injection nozzle connected into the recess 12 after the movable mold-defining member 2 is joined to the stationary one 3 as shown in FIG. 1, and its flow is stopped by one side 36 of the diametrically reduced end portion 35 of the dividing member 30a, as shown in FIG. 4. Then, a different molding resin material having a "B" color is injected into the runner channel 16 through the injection nozzle connected in the recess 55 and the sprue hole 56. Although it may temporarily be stopped by the opposite side 37 of the end portion 35 of the dividing member 30a, the material having a "B" color flows into the recess 40 and its pressure acts upon the bottom 41 of the recess 40 and thereby pushes the dividing member 30a back out of the runner channel 16 by overcoming the force of the coiled spring 31a. The material fills the space occupied until then by the end portion of the dividing member 30a and becomes joined with the material having an "A" color, as shown in FIG. 5. Thus, a multicolored runner 17 is formed in the runner channel 16.

Figure 6:
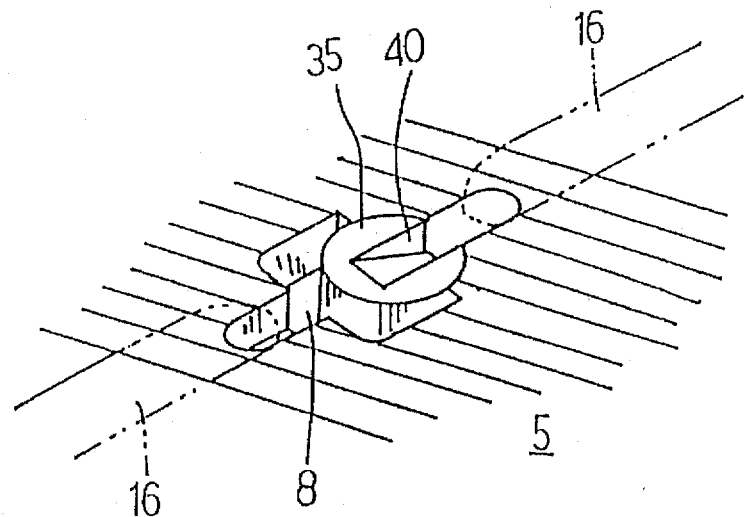
FIG. 6 is a fragmentary enlarged perspective view of a male mold-defining member.
Figure 7:
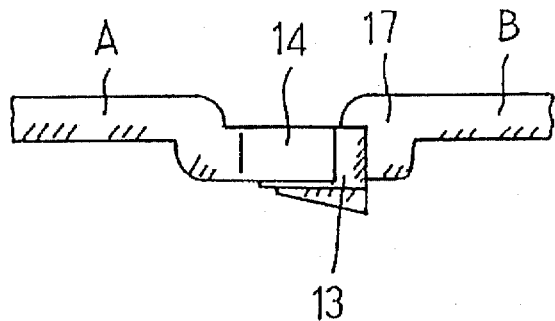
FIG. 7 is a side elevational view of a runner.
Figure 8:
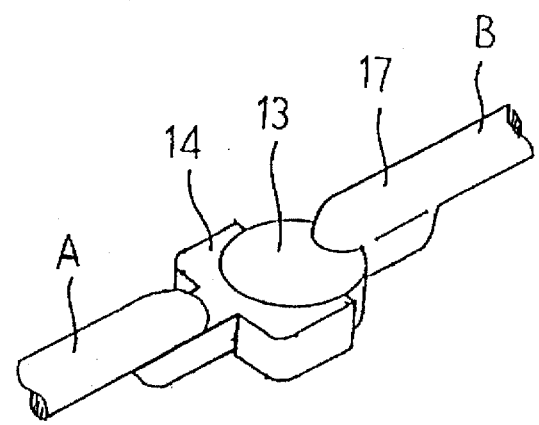
FIG. 8 is a perspective view of the runner.
Figure 9:
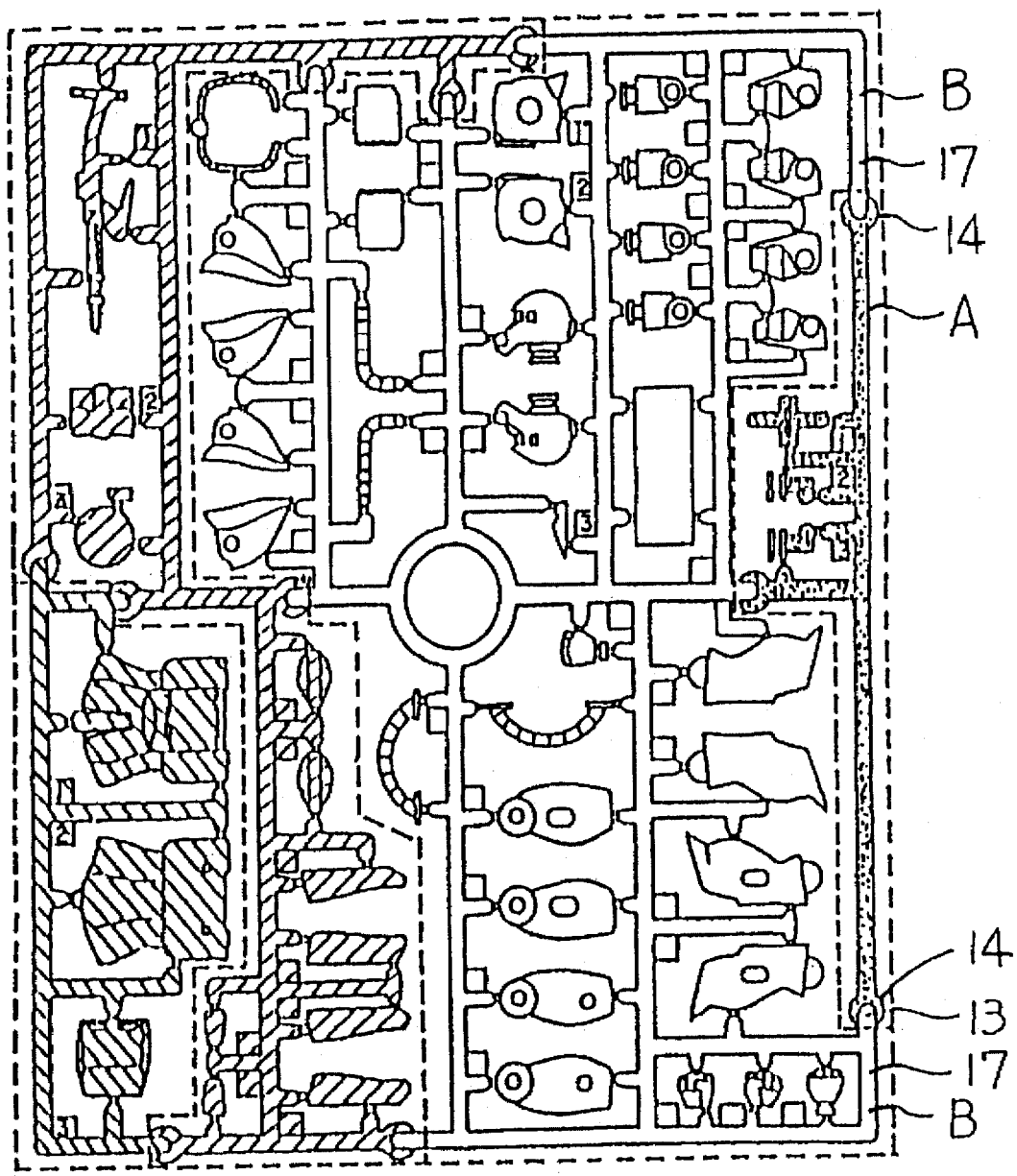
FIG. 9 is a top plan view of a multicolored molded product.

If the male mold-defining member 5 has a cavity 8 surrounding a part of the circumference of the end portion 35 as shown in FIG. 6, a runner portion 14 molded in the cavity 8 holds a circular protrusion 13 formed after the retraction of the end portion 35, as shown in FIGS. 7 and 8, whereby the material having a "B" color is strongly joined with the material having an "A" color. FIG. 9 is a front elevational view showing by way of example a multicolored molded product including a multicolored runner 17.

Figure 12:
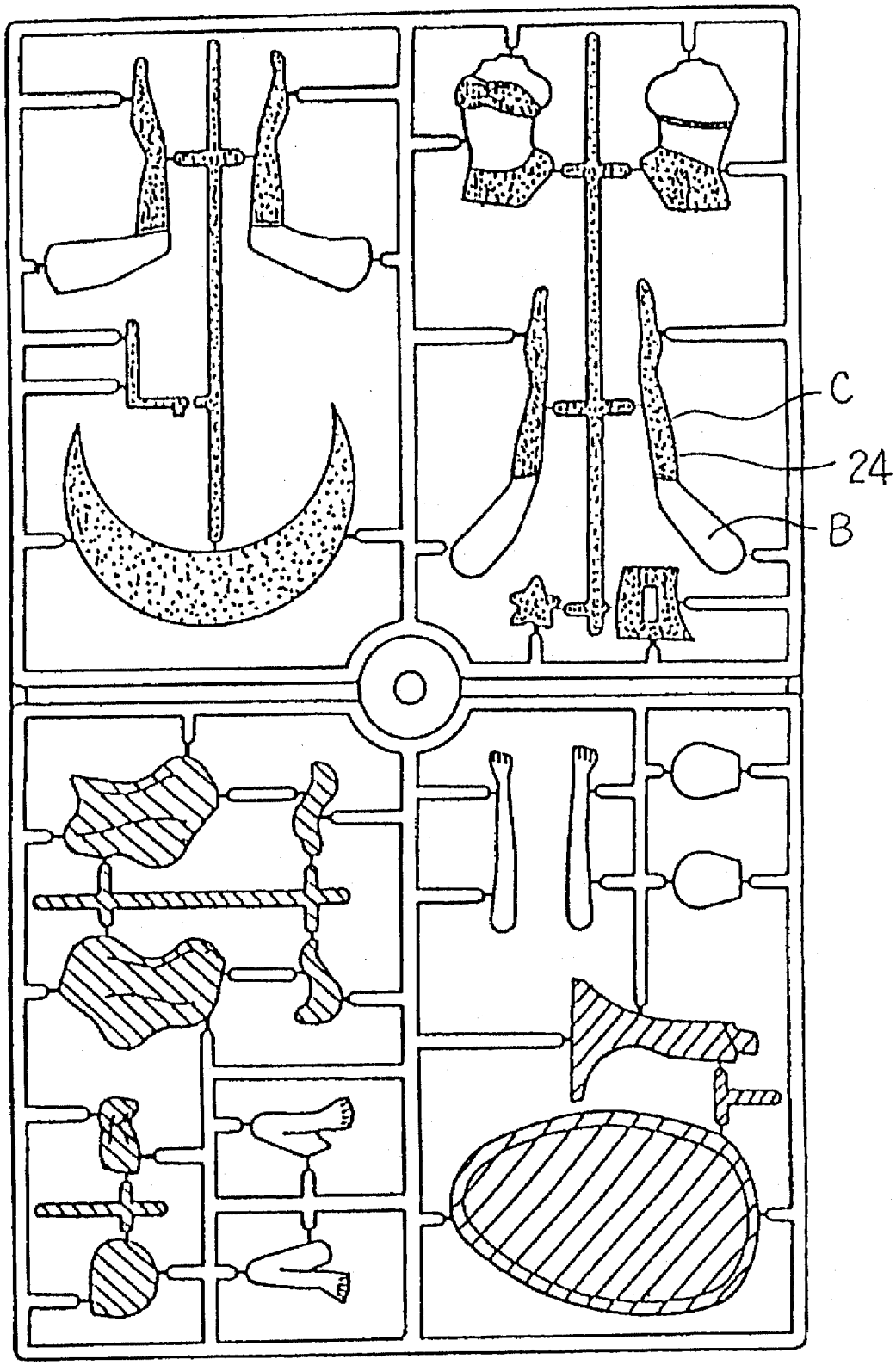
FIG. 12 is a top plan view of a multicolored molded product.

The molding resin material having a '1B" color also flows into the mold 18 through the runner channel 15, as shown in FIG. 10. Its flow is stopped by one side 46 of the end portion 43 of the dividing member 30b. Then, a different molding resin material having a "C" color is injected into the runner channel 15 through the injection nozzle connected into the recess 11 so as to flow into the mold 18. Although its flow may temporarily be stopped by the opposite side 47 of the end portion 43 of the dividing member 30b, the material "C" flows into the recess 48 and its pressure acts upon the bottom 49 of the recess 48 and thereby pushes the dividing member 30b back out of the mold 18, as shown in FIG. 11. Thus, the material having a "C" color is joined with the material having a "B" color, whereby a multicolored molded product 24 is formed in the mold 18. FIG. 12 is a front elevational view showing a multicolored molded product 24 by way of example.

Then, the movable mold-defining member 2 is separated from the stationary one 3 and the push shaft 25 is moved to push the slide plate 20 and thereby the knockout pins 21 to eject the multicolored runner and molded product from the male mold-defining member 5.

Although the dividing members 30a and 30b have been described and shown as belonging to the movable mold-defining member 2, it is needless to say that they can alternatively be located in the stationary mold-defining member 3. It is also needless to say that the coiled springs 31 employed as the elastic members for urging the dividing members 30a and 30b can be replaced by rubber members, leaf springs, or other elastic parts.

Figure 13A:
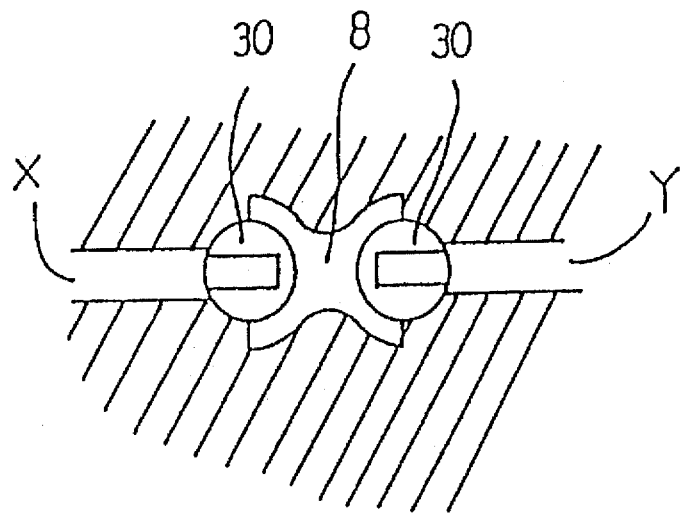
FIGS. 13(a) to 13(c) are a set of fragmentary sectional views showing a modified form of apparatus embodying this invention at different points of time in a molding operation.

The apparatus embodying this invention as described above makes it necessary to control the timing of injection by each injection nozzle so that the molding resin material to be stopped by one side of each dividing member 30 may reach it earlier than the other material reaches its opposite side. If a pair of dividing members 30a, 30b are located at the opposite ends, respectively, of the cavity 8 as shown in FIG. 13(a), however, it is no longer necessary to control the timing of injection as stated above, but it is possible to inject the two materials simultaneously and thereby achieve an improved efficiency in any such molding operation.

Figure 13B:
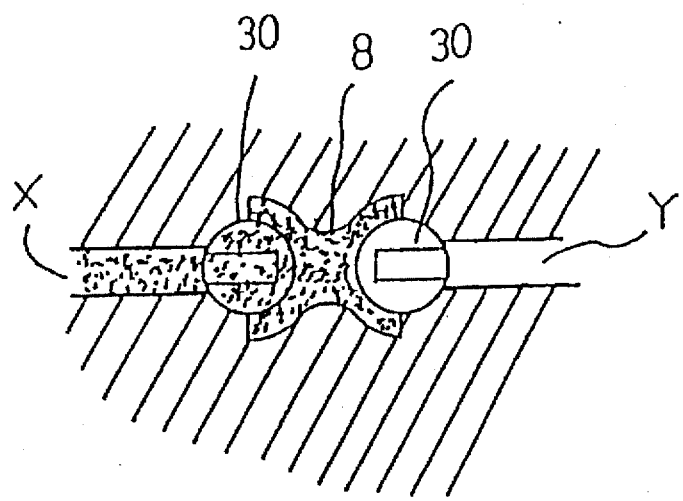
Figure 13C:
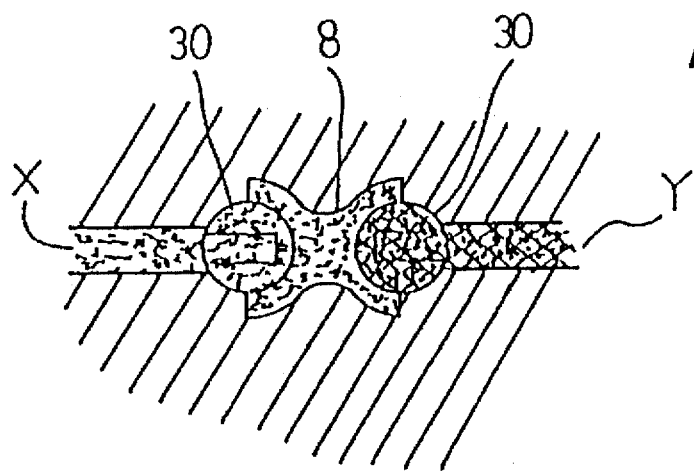

Even if two materials are injected simultaneously in the opposite directions, they hardly flow into the cavity 8 simultaneously, but it is almost always true that one of the materials reaches the cavity 8 earlier than the other. Referring to FIG. 13(b), therefore, a molding resin material having an "X" color and injected through a runner channel X pushes back the left dividing member 30, flows into the cavity 8 and is stopped by the right dividing member 30, while another molding resin material having a "Y" color and injected through a runner channel Y pushes back the right dividing member 30 and becomes welded to the material having an "X" color, as shown in FIG. 13(c) or vice versa. If there is only one dividing member, and if the material flowing in one direction toward the recessed side of the dividing member reaches it earlier than the material flowing in the opposite direction, the former material pushes back the dividing member, flows into an undesirable runner or cavity portion and mixes undesirably with the latter material to yield an undesirably colored product.

The other embodiment as described above will now be described more specifically with reference to FIGS. 14 to 27. The molding apparatus 71 comprises a movable mold-defining member 72 mounted on the movable side of a known injection machine (not shown) and a stationary mold-defining member 73 mounted on its stationary side. FIG. 15 is a cross sectional view of the molding apparatus 71 having its movable and stationary mold-defining members 72 and 73 joined together.

The movable mold-defining member 72 comprises a male mold mounting plate 76 on which a male mold 75 is mounted, a movable side mounting plate 79 which is attached to the injection machine, and spacers 80 disposed on both sides between the male mold mounting plate 76 and the movable side mounting plate 79. Injection nozzles can be connected into receses 81 and 82 for injecting differently colored molding resin materials through runner channels 85 and 86 into the mold 88. Mold 88 is between the male mold 75 and a female mold 121 which will hereinafter be described.

The male mold mounting plate 76 and the movable side mounting plate 79 define a chamber 89 therebetween. The chamber 89 contains a movable assembly of a front ejecting plate 90 and a rear ejecting plate 91 fastened together by bolts, or the like. The front and rear ejecting plates 90 and 91 are provided with a plurality of dividing members 100. The dividing members 100 extend through the male mold mounting plate 76, the male mold 75, etc., and have free ends which are movable into and out of the runner channels 85 and 86 for ejecting multi-colored runners molded in the runner channels 85 and 86, as will be described in detail. The rear ejecting plate 91 is secured by a bolt, or the like to a push shaft 95 inserted in a hole 92 formed substantially in the center of the movable side mounting plate 79.

The stationary mold-defining member 73 comprises a stationary side mounting plate 120 attached to the injection machine (not shown), a female mold mounting plate 122 mounted on the stationary side mounting plate 120 and the female mold 121 mounted on the female mold mounting plate 122. A recess 125 is formed in the stationary side mounting plate 120 for connecting an injection nozzle. The injection nozzle connected in the recess 125 has its end connected with a sprue hole 126 formed in the female mold mounting plate 122 and the female mold 121. The sprue hole 126 connects to the runner channels 85 and 86.

The dividing members 100 will now be described in detail. Each dividing member 100 preferably is in the form of a round shaft, and has a recess 110 at its free end (see FIG. 20) and a flange 102 at its bottom end, as shown in FIG. 16. The dividing member 100 has a rear portion disposed slidably in a hole 99 formed in the front ejecting plate 90. The flange 102 is disposed slidably in a slide hole 96 in the front ejecting plate 90, and is urged toward the runner channel 85 or 86 by a spring 101 disposed in a spring hole 104 in the rear ejecting plate 91 to engage the top wall 103 of the slide hole 96.

Figure 19:
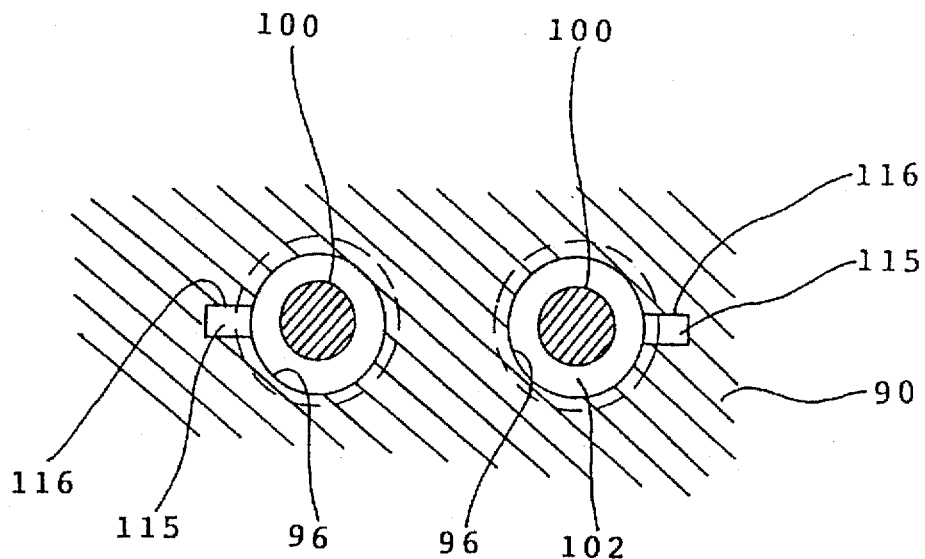
FIG. 19 is a partly cut away cross sectional plan view showing an alternative embodiment of a male mold-defining member of this invention.

The flange 102 can be forced down by overcoming the elasticity of the spring 101 until it engages a shoulder 117 formed above the spring hole 104. On one side of the slide hole 96, there is an engaging groove 116 in which an engaging shaft 115 projecting from the flange 102 is slidably engaged, as shown in FIG. 19. Thus, the dividing member 100 does not rotate.

The dividing member 100 is urged by the elasticity of the coil spring 101 to have its free end protruding into the runner channels 85, 86 and impinging upon the female mold 121 or the female mold mounting plate 122. The dividing member 100 has one side 106 which is substantially perpendicular to the direction of flow of a molding resin material in the runner channel 85 or 86, as shown in FIG. 16. On another side 107 thereof, it has the recess 110 which is open at its top end 109 (see FIG. 20).

Tow dividing members 100 preferably are paired together. Each pair is adapted to protrude into a runner channel, 85, 86. The sides 106 of each pair of dividing members 100 face each other.

The molding apparatus 71 constructed as described above has its movable mold-defining member 72 mounted on the movable side of the injection machine and its stationary mold-defining member 73 on the stationary side thereof. When the movable mold-defining member 72 is joined to the stationary mold-defining member 73, the mold 88 and the runner channels 85 and 86 for introducing the molding resin materials into the mold 88 are formed, as shown in FIG. 16.

If a molding resin material A having an "A" color is injected into the runner channel 85 by the injection nozzle connected with the recess 81, the molding resin material A flows into the recess 110 on the other side 107 of the nearer dividing member 100, as shown in FIG. 21. The flowing pressure of the molding resin material A acts upon the bottom 111 of the recess 110 and forces down the dividing member 100 by overcoming the elasticity of the spring 101. The molding resin material A flows further in the runner channel 85, is blocked by one side 106 of the next dividing member 100 and stops flowing.

A molding resin material B having a "B" color is injected into the runner channel 85 through the sprue hole 126 by the injection nozzle connected in the connecting recess 125. The molding resin material B flows in the opposite direction through the runner channel 85 and flows into the recess 110 on the other side 107 of the next dividing member 100 as shown in FIG. 22. The flowing pressure of the molding resin material B acts upon the bottom 111 of the recess 110 and forces down the dividing member 100 by overcoming the elasticity of the elastic member 101. The differently colored molding resin material B flows into the space occupied until then by the dividing member 100 and is joined with the first molding resin material A. Thus, a multicolored runner 84 is formed in the runner channel 85.

Figure 26:
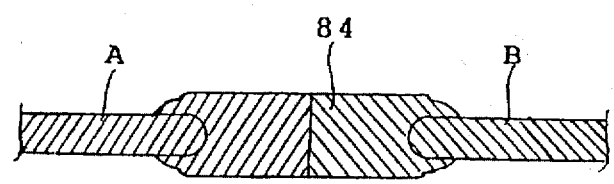
FIG. 26 is a plan view of a runner.

If the molding resin materials A and B flow into the recesses 110 of the two dividing members 100 substantially at the same time, the two dividing members 100 are forced down substantially at the same time and there is formed a product having a mixture of colors between the dividing members 100 (see FIG. 26). The molding resin material A or B is, however, does not flow beyond the space between the dividing members 100. The mold 88 always forms a molded product having a predetermined color, even if the two materials may be injected at the same time.

Figure 18:
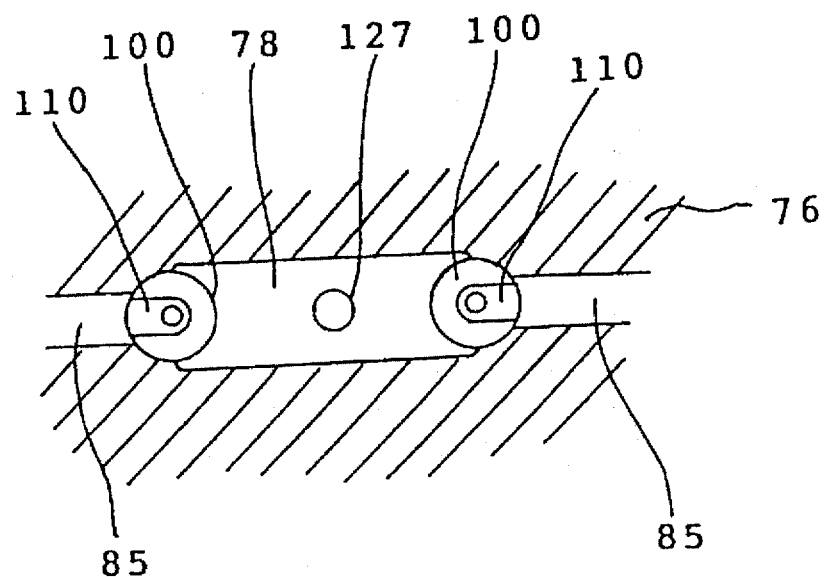
FIG. 18 is a partly cut away plan view showing an alternative embodiment of a male mold-defining member of this invention.
Figure 20:
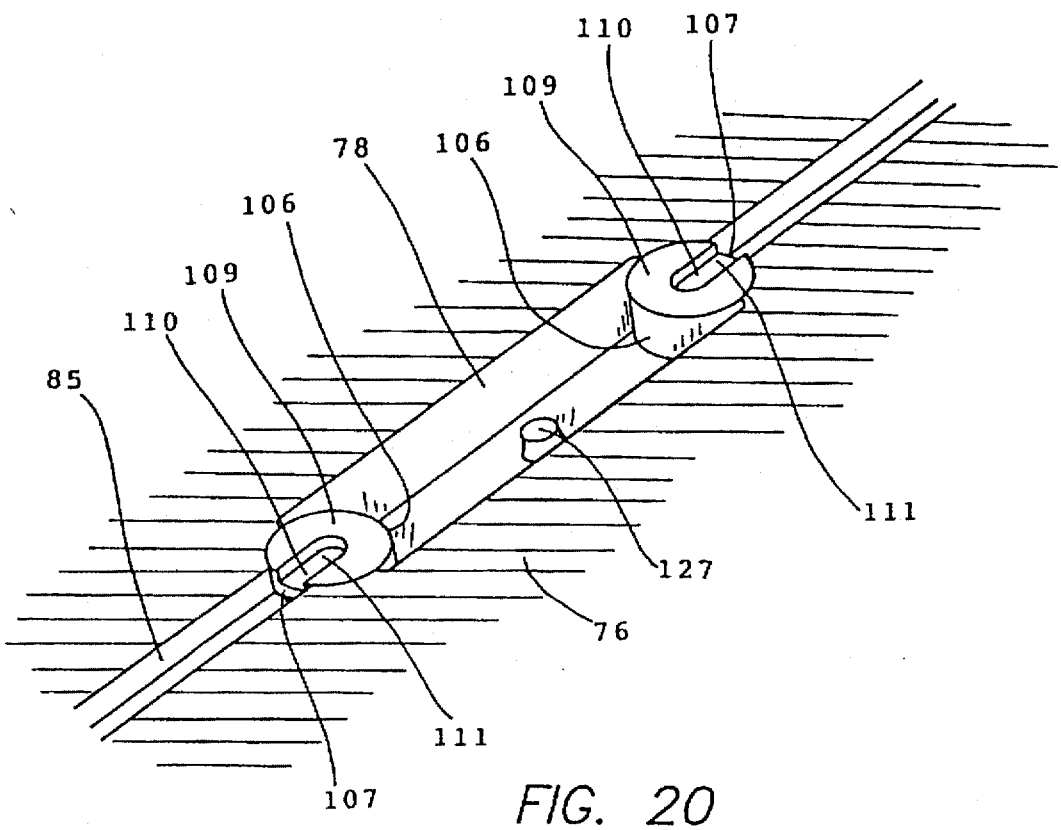
FIG. 20 is a partly cut away perspective view showing an alternative embodiment of a male mold-defining member of this invention.
Figure 23:
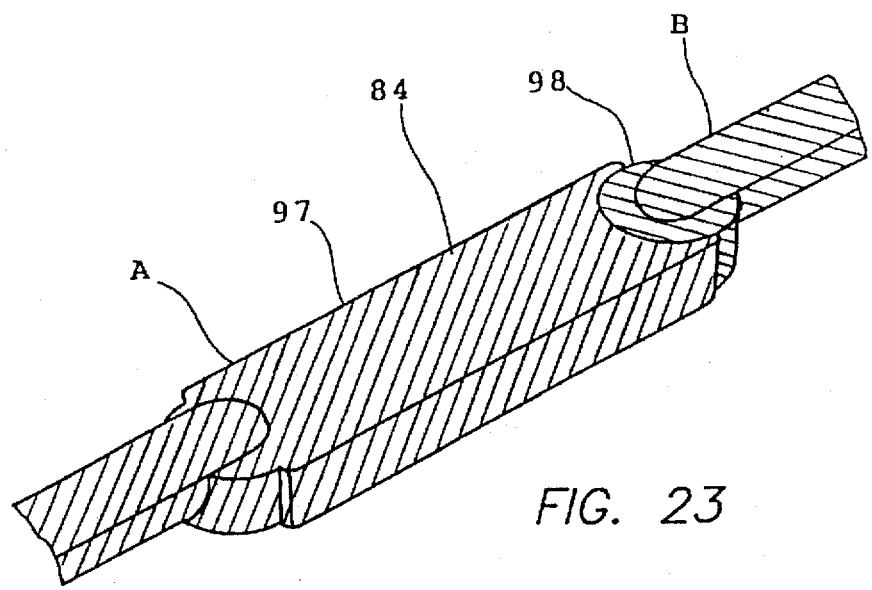
FIG. 23 is a perspective view of a runner.
Figure 24:
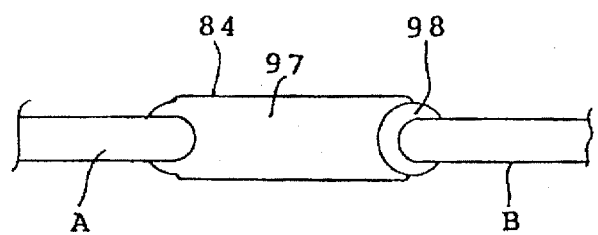
FIG. 24 is a plan view of a runner.
Figure 25:
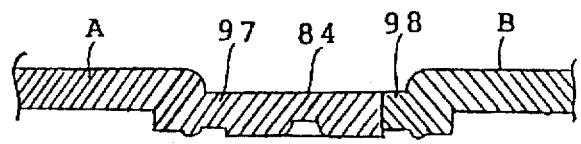
FIG. 25 is a cross sectional view of a runner.

If the male mold mounting plate 75 has a molding recess 78 extending along a half of the circumference of each of the two dividing members 100, as shown in FIGS. 18 and 20, a segment 97 molded in the molding recess 78 grips circular protrusions 98 molded after the dividing members 100 have been forced down, as shown in FIGS. 23 to 25, so that the molding resin material A having an "A" color and the molding resin material B having a "B" color are firmly joined together. A projection 127 formed on the bottom of the molding recess 78 holds the molded segment 97 against displacement.

Figure 27:
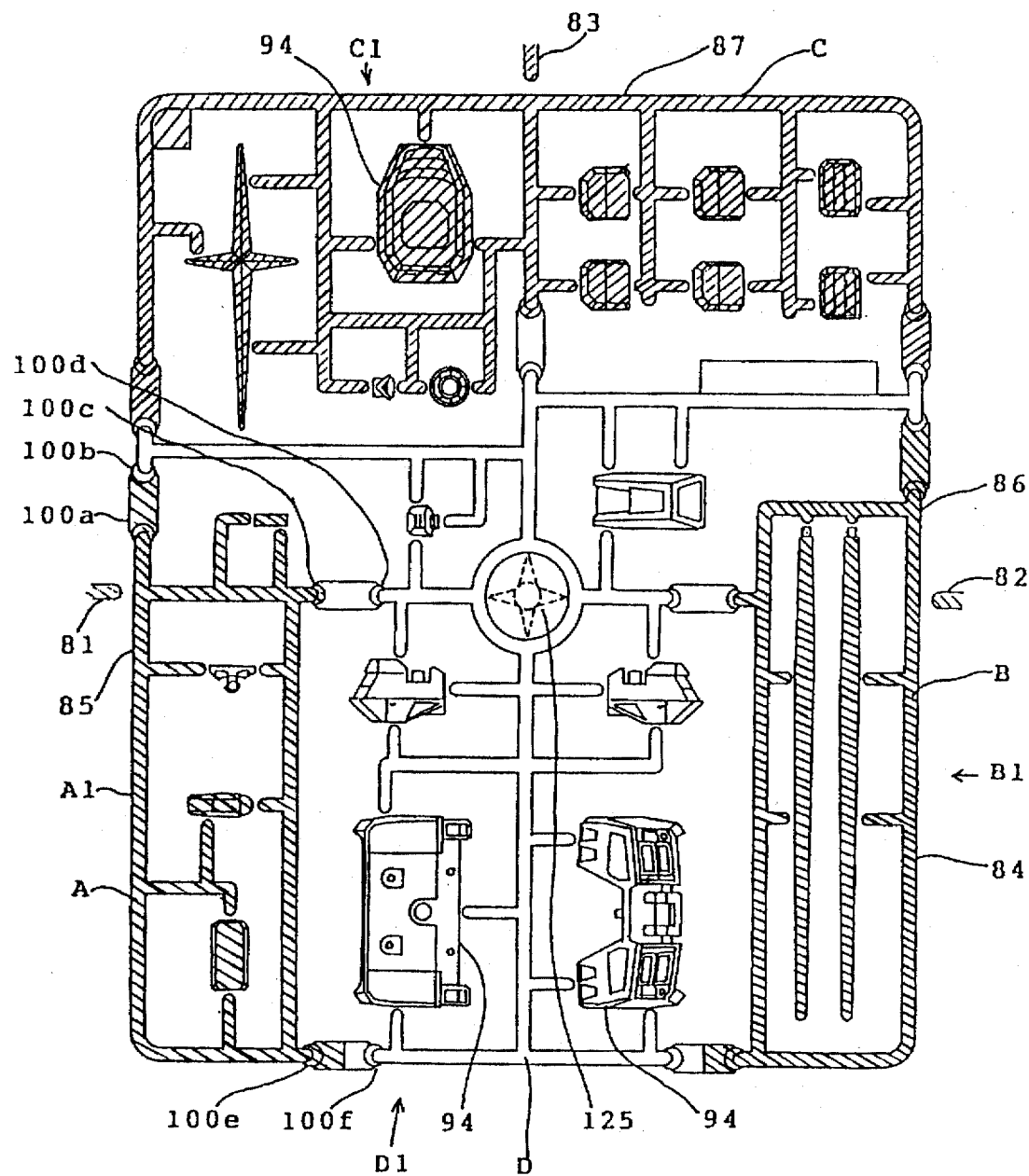
FIG. 27 is a plan view of a multicolored molded product.

The molded product shown in FIG. 27 is molded by employing pair of dividing members, and having four differently colored molded portions. The molded portion A1 is molded by injecting a molding resin material A into the runner channel 85 through an injection nozzle connected in the recess 81, as shown in FIG. 14. The molded portion B1 is molded by injecting a molding resin material B into the runner channel 86 through an injection nozzle connected in the recess 82, as shown in FIG. 14. The molded portion C1 is molded by the molding resin materials A to D may be injected at the same time.

If the injection machine is driven to separate the movable mold-defining member 72 from the stationary mold-defining member 73, and if the push shaft 95 is pushed to move the ejecting plates 90 and 91 toward the stationary mold-defining member 73, the runner 84 adhering to the male mold 75 and the male mold mounting plate 76 in the movable mold-defining member 72 is ejected by the dividing members 100 and the product 94 molded in the mold 88 can be removed from the molding apparatus 71. Therefore, a conventional knockout pin is not required.

Thus, it is senn that a molding apparatus according to the present invention has the advantage that it eliminates the necessity for the transfer of a molded product from one mold to another, as is typical in conventional molding apparatus, and can mold a multi-colored runner or product in a single mold with a less complex mechanism including dividing members urged by elastic members to divide runner channels, or the mold. Other advantages include less complexity that typical molding machines, smaller size and weight, and lower manufacturing costs.

According to the molding apparatus of the invention, each runner channel may be divided by a pair of dividing members in such a way that a molding resin material flowing past one of the dividing members may be blocked by the other. Two molding resin materials flowing past the two dividing members at the same time meet each other therebetween and stop flowing, so that neither of the molding resin materials may flow beyond one or the other of the dividing members. This provides an advantage of being able to ensure the manufacture of a desirably multicolored molded product without allowing any molding resin material having a particular color to flow from a predetermined portion for which that color has been selected, to any other portion having a different color, even if differently colored molding resin materials may be injected at the same time. As the differently colored molding resin materials do not have to be injected in a particular order, but can be injected simultaneously, it is possible to realize a greatly shortened molding cycle and lower cost of production. In addition, knockout pins are not required for ejecting a molded product.

Thus, it is seen that a molding apparatus is provided. One skilled in the art will appreciate that the present invention can be practiced by other than the preferred embodiments which are provided for purposes of illustration and not of limitation, and the present invention is limited only by the claims which follow.

What is claimed is:

1. A molding apparatus for use in an injection machine having a movable side and stationary side, the molding apparatus comprising:

a movable mold-defining member mounted on the movable side of the injection machine and a stationary mold-defining member mounted on the stationary side of the injection machine, said mold-defining members being joinable to define therebetween a mold cavity and a plurality of runner channels through which molding resin materials flow into said cavity;

at least one dividing member provided in one of said mold-defining members, the dividing member being movable into a first one of said channels for dividing said one of said channels into a plurality of portions;

said at least one dividing member including:
an elastic member urging each of said dividing member into said first channel;
a first side which is substantially perpendicular to the direction of flow of first molding resin material to stop its flow through said a first channel when the dividing member is in said first channel; and
a second side opposite the first side which is partially cut away to form a recess at one end thereof, so that a second molding resin material reaching said opposite side may flow into said recess and thereby move said dividing member out of said first channel by overcoming the force of said elastic member.

2. A molding apparatus as set forth in claim 1, wherein said at least one dividing member includes a first dividing member and a second dividing member;
wherein both of said first and second dividing members are substantially perpendicular to the flow of molding resin material; and the first side of said first dividing member faces the first side of said second dividing member.

3. A molding apparatus as set forth in claim 1 wherein:
said movable mold-defining member defines a chamber; and
the mold-defining member includes an ejection plate within said chamber; and
the ejecting plate includes a dividing member.

4. A molding apparatus as set forth in claim 2 wherein:
said movable mold-defining member defines a chamber; and
the mold-defining member includes an ejection plate within said chamber; and
the ejecting plate includes a dividing member.

5. A molding apparatus for use in an injection machine having a movable side and stationary side, the molding apparatus comprising:

a movable mold-defining member mounted on the movable side of the injection machine and a stationary mold-defining member mounted on the stationary side of the injection machine, said mold-defining members being joinable to define therebetween at least one mold cavity and a plurality of runner channels through which molding resin materials flow into said cavity;

at least one dividing member provided in one of said mold-defining members, the dividing member being movable into a first one of said at least one mold cavity for dividing said first one of said at least one mold cavity into a plurality of portions;

each of said at least one dividing member including:
an elastic member urging said dividing member into said first mold cavity;
a first side which is substantially perpendicular to the direction of flow of a first molding resin material to stop its flow through said first mold cavity when the dividing member is in said first mold cavity; and
a second side opposite the first side which is partially cut away to form a recess at one end thereof, so that a second molding resin material reaching said opposite side may flow into said recess and thereby move said dividing member out of said first mold cavity by overcoming the force of said elastic member.

6. A molding apparatus as set forth in claim 5 wherein:
said movable mold-defining member defines a chamber; and
the mold-defining member includes an ejection plate within said chamber; and
the ejecting plate includes a dividing member.

* * * * *